(12) United States Patent
Franzen et al.

(10) Patent No.: US 11,059,976 B2
(45) Date of Patent: Jul. 13, 2021

(54) ASPHALT COMPOSITIONS INCLUDING RECLAIMED ASPHALT MATERIAL

(71) Applicant: Owens Corning Intellectual Capital, LLC, Toledo, OH (US)

(72) Inventors: Michael Franzen, Lombard, IL (US); Laurand Lewandowski, Newark, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 213 days.

(21) Appl. No.: 16/429,572

(22) Filed: Jun. 3, 2019

(65) Prior Publication Data

US 2019/0375940 A1    Dec. 12, 2019

Related U.S. Application Data

(60) Provisional application No. 62/682,520, filed on Jun. 8, 2018.

(51) Int. Cl.
*C08L 95/00* (2006.01)
*C08L 91/06* (2006.01)

(52) U.S. Cl.
CPC ............. *C08L 95/00* (2013.01); *C08L 91/06* (2013.01); *C08L 2205/02* (2013.01); *C08L 2555/34* (2013.01); *C08L 2555/72* (2013.01)

(58) Field of Classification Search
None
See application file for complete search history.

(56) References Cited

U.S. PATENT DOCUMENTS

| | | | |
|---|---|---|---|
| 4,222,851 A | 9/1980 | Good et al. | |
| 4,706,893 A | 11/1987 | Brock | |
| 5,098,025 A | 3/1992 | Drouin et al. | |
| 5,236,497 A | 8/1993 | Grzybowski | |
| 5,451,003 A | 9/1995 | Omann | |
| 6,228,503 B1 | 5/2001 | Zickell | |
| 6,290,152 B1 | 9/2001 | Zickell | |
| 8,177,152 B2 | 5/2012 | Harmon | |
| 8,789,773 B2 | 7/2014 | Teeter, Jr. et al. | |
| 9,273,228 B1 | 3/2016 | Hyer et al. | |
| 9,295,992 B2 | 3/2016 | Zickell | |
| 9,440,239 B1 | 9/2016 | Horton et al. | |
| 9,605,152 B2 | 3/2017 | Ruan et al. | |
| 2014/0014000 A1 | 1/2014 | Franzen et al. | |

FOREIGN PATENT DOCUMENTS

WO    WO-2010077141 A1 * 7/2010 .............. C08L 95/00

OTHER PUBLICATIONS

Daniel J. Oldham et al., "Application of a bio-binder as a rejuvenator for wet processed asphalt shingles in pavement construction," Construction and Building Materials, vol. 86, Jul. 1, 2015, pp. 75-84.

Miriam Estevez, "Use of coupling agents to stabilize asphalt-rubber-gravel composite to improve its mechanical properties," Journal of Cleaner Production, vol. 17, Issue 15, Oct. 2009, pp. 1359-1362, Abstract Only.

* cited by examiner

*Primary Examiner* — Randy P Gulakowski

(74) *Attorney, Agent, or Firm* — Calfee, Halter & Griswold LLP

(57) ABSTRACT

Asphalt compositions for use in roofing products are disclosed that include a virgin asphalt material and a reclaimed asphalt material. The asphalt compositions exhibit properties comparable to conventional oxidized asphalt compositions, yet the asphalt compositions are made without using an oxidation or air blowing process.

23 Claims, No Drawings

ASPHALT COMPOSITIONS INCLUDING RECLAIMED ASPHALT MATERIAL

CROSS-REFERENCE TO RELATED APPLICATIONS

This application claims priority to and the benefit of U.S. Provisional Patent Application No. 62/682,520, filed Jun. 8, 2018, the entire content of which is incorporated by reference herein.

FIELD

The present disclosure relates generally to asphalt compositions for roofing products, including asphalt compositions for Built-Up Roofing Asphalt (BURA) and asphalt compositions for coating asphalt to make asphalt roofing shingles. More particularly, the present disclosure relates to asphalt compositions and methods of making asphalt compositions that include reclaimed asphalt material and that are not subjected to further air blowing processes.

BACKGROUND

Asphalt compositions for roofing products are generally produced by selecting a suitable asphalt, or flux asphalt, and processing the asphalt to obtain particular properties useful for the desired end use, such as a BURA or a coating asphalt. It is important that the asphalt in a roofing product retains some degree of resistance to flow and does not flow under conditions of high temperature.

One process for converting the asphalt into a form suitable for use in roofing products is an oxidation process. In such an oxidation process, air is blown through molten asphalt for a particular period of time to modify the physical properties of the asphalt. Generally, the oxidation process raises the softening point of the asphalt, which increases the asphalt's resistance to flow at high temperatures on a roof. However, there are a number of drawbacks to the use of oxidized asphalt. For instance, the oxidation process of non-coating grade asphalt is an expensive and time-consuming process. Moreover, the International Agency for Research on Cancer (IARC) has classified occupational exposures to oxidized asphalts and their emissions as probably carcinogenic to humans.

There is considerable waste associated with the manufacture and use of asphalt roofing products. For example, shingle manufacturers may generate scrap shingle material (manufactured waste shingles) from processes that include cutting out tabs in the shingles. Additional waste material is generated by removing old shingles from residential buildings (tear-off shingles). The manufactured waste shingles and tear-off shingles are typically discarded in landfills.

SUMMARY

Disclosed herein are asphalt compositions and methods of making asphalt compositions that include the use of reclaimed asphalt material that is not subjected to an oxidation process. To illustrate various aspects of the present disclosure, several exemplary embodiments of asphalt compositions and methods of making the asphalt compositions are provided.

In one exemplary embodiment, an asphalt composition is provided. The asphalt composition comprises a virgin asphalt material and a reclaimed asphalt material having a solubility of at least 94% and a softening point of 190° F. to 320° F. The asphalt composition has a solubility of at least 99%, a softening point of 135° F. to 235° F., and a penetration at 77° F. of 12 dmm to 60 dmm.

In one exemplary embodiment, a wax-modified asphalt composition is provided. The asphalt composition comprises a virgin asphalt material, a reclaimed asphalt material having a solubility of at least 94% and a softening point of 190° F. to 320° F., and a wax. The wax-modified asphalt composition has a solubility of at least 95%, a softening point of 210° F. to 230° F., and a penetration at 77° F. of 12 dmm to 30 dmm.

In one exemplary embodiment, a method of making an asphalt composition is provided. The method includes mixing a virgin asphalt material with a reclaimed asphalt material at a temperature of 300° F. to 400° F. to form the asphalt composition. The reclaimed asphalt material has a solubility of at least 94% and a softening point of 190° F. to 320° F. The asphalt composition has a solubility of at least 99%, a softening point of 135° F. to 235° F., and a penetration at 77° F. of 12 dmm to 60 dmm. The method of making the asphalt composition does not use an oxidation process.

In one exemplary embodiment, a method of making a wax-modified asphalt composition is provided. The method includes mixing a virgin asphalt material, a reclaimed asphalt material, and a wax at a temperature of 300° F. to 400° F. to form the wax-modified asphalt composition. The reclaimed asphalt material has a solubility of at least 94% and a softening point of 190° F. to 320° F. The wax-modified asphalt composition has a solubility of at least 95%, a softening point of 210° F. to 230° F., and a penetration at 77° F. of 12 dmm to 30 dmm. The method of making the wax-modified asphalt composition does not use an oxidation process.

DETAILED DESCRIPTION

Disclosed herein are asphalt compositions and methods of making asphalt compositions. While the present disclosure describes certain embodiments of the asphalt compositions and methods in detail, the present disclosure is to be considered exemplary and is not intended to be limited to the disclosed embodiments.

The terminology as set forth herein is for description of the embodiments only and should not be construed as limiting the disclosure as a whole. All references to singular characteristics or limitations of the present disclosure shall include the corresponding plural characteristic or limitation, and vice versa, unless otherwise specified or clearly implied to the contrary by the context in which the reference is made. Unless otherwise specified, "a," "an," "the," and "at least one" are used interchangeably. Furthermore, as used in the description and the appended claims, the singular forms "a," "an," and "the" are inclusive of their plural forms, unless the context clearly indicates otherwise.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all sub-ranges beginning with a minimum value of 1 or more and ending with a maximum value of 10 or less (e.g., 1 to 6.1, or 2.3 to 9.4), and to each integer (1, 2, 3, 4, 5, 6, 7, 8, 9, and 10) contained within the range.

Any combination of method or process steps as used herein may be performed in any order, unless otherwise specified or clearly implied to the contrary by the context in which the referenced combination is made.

The term "virgin asphalt material" as used herein, is meant to include asphalt produced, for example, from petroleum refining, including residua from atmospheric distillation, from vacuum distillation, and from solvent de-asphalting units, as well as natural bitumen-like the products extracted from the oil sands in Alberta, or asphalts derived from oil sands by various refinery processes. The virgin asphalt material is non-oxidized and has not previously been used in any type of product. The term "virgin asphalt material" may also refer to a mixture of different virgin asphalt materials.

The term "reclaimed asphalt material" as used herein, refers to asphalt derived from tear-off shingles, manufactured waste shingles, and combinations thereof. The term "tear-off shingles" as used herein, refers to post-consumer asphalt shingle waste that results from building activities such as construction, demolition, and renovation. Generally, tear-off shingles have undergone some amount of weathering and aging from exposure to ultraviolet light from the sun. The term "manufactured waste shingles" as used herein, refers to the scrap asphalt shingle material generated during the process of manufacturing asphalt shingles. Manufactured waste shingles are generally unused and not weathered or aged.

The term "BURA" as used herein, refers to asphalt that is suitable for use in built-up roof construction according to ASTM D312/D312M-16a, displayed below in Table 1. There are four accepted types of BURA. Each of the four types is listed below in Table 1.

maximum of 110° C. (230° F.), a minimum penetration at 25° C. (77° F.) of 12 dmm, a maximum penetration at 25° C. (77° F.) of 30 dmm, and a solubility in trichloroethylene or 1-bromopropane of at least 95%. Any type of wax, or a mixture of different waxes, capable of functioning as described herein can be used. In one exemplary embodiment, the wax has a high congealing point or a high drop melt point of at least about 75° C., specifically at least about 90° C., more specifically at least about 100° C., and up to about 160° C. When referring to wax testing, the term "melt point" refers broadly to either congealing point or drop melt point, which are defined by ASTM D 938 in the case of congealing point and ASTM D 3954 in the case of drop melt point.

The properties of the asphalt compositions disclosed herein may be measured by any suitable test known and accepted in the art. In the description provided herein, the asphalt properties are measured as follows: softening point or "SP" by ASTM D36 (ring-and-ball apparatus) or ASTM D3461 (Mettler cup-and-ball method); penetration or "pen" by ASTM D5 run at 25° C. (77° F.); melt viscosity by ASTM D4402 run at 204° C. (400° F.) with a Model LV Brookfield Viscometer, using a no. 18 spindle, 6 RPM or a Model RV Brookfield Viscometer, using a no. 21 spindle, 50 RPM; durability by ASTM D4798 and ASTM D1670; flashpoint by ASTM D92; stain index by ASTM D2746; and stability by ASTM D3791 modified to run at an oven temperature of 260° C. (500° F.) for up to 5 days or similar test procedure.

With respect to certain asphalt properties, each asphalt manufacturer may determine whether the results achieved

TABLE 1

| Property | TYPE 1 Min | TYPE 1 Max | TYPE 2 Min | TYPE 2 Max | TYPE 3 Min | TYPE 3 Max | TYPE 4 Min | TYPE 4 max |
|---|---|---|---|---|---|---|---|---|
| Softening point ° C. | 57 | 66 | 70 | 80 | 85 | 96 | 99 | 107 |
| (° F.) | (135) | (151) | (158) | (176) | (185) | (205) | (210) | (225) |
| Flash Point, ° C. | 302 | — | 302 | — | 302 | — | 302 | — |
| (° F.) | (575) | | (575) | | (575) | | (575) | |
| Penetration Units: (dmm) | | | | | | | | |
| at 0° C. (32° F.) | 3 | — | 6 | — | 6 | — | 6 | — |
| at 25° C. (77° F.) | 18 | 60 | 18 | 40 | 15 | 35 | 12 | 25 |
| at 46° C. (115° F.) | 90 | 180 | — | 100 | — | 90 | — | 75 |
| Ductility at 25° C. (77° F.), cm | 10.0 | — | 3.0 | — | 2.5 | — | 1.5 | — |
| Solubility in trichloroethylene, % | 99 | — | 99 | — | 99 | — | 99 | — |
| EVT, ° C. (° F.) | | | | | | | | |
| at 125 cPs | | | | | | 221 (430) | | 235 (455) |
| at 75 cPs | | | | | | 243 (470) | | 252 (485) |

The terms "roofing shingle coating asphalt" and "coating asphalt" as used herein, refer to asphalt that is suitable for use as a coating asphalt to make asphalt roofing shingles as defined by ASTM D3462, which sets forth the following specifications: a softening point minimum of 88° C. (190° F.), a softening point maximum of 113° C. (235° F.), and a minimum penetration at 25° C. (77° F.) of 15 dmm.

The term "wax-modified asphalt" as used herein, refers to asphalt that includes a wax that is suitable for use in built-up roof construction as defined by ASTM D8051/D8051M-16, which sets forth the following specifications: a softening point minimum of 99° C. (210° F.), a softening through testing are acceptable for their products. For example, durability or weatherability of asphalt can be measured using ASTM D4798 in conjunction with ASTM D1670. The procedure used in ASTM D4798 simulates accelerated aging of the asphalt, typically using a xenon-arc weatherometer. During testing in accordance with ASTM D4798, a sample may be pulled each week and tested in accordance with ASTM D1670, which uses a spark generating apparatus to determine failure due to cracking of the asphalt material undergoing accelerated weathering. These procedures are repeated until the asphalt material fails, at which point the weatherability cycles or days to failure are determined. Generally, a weatherability of at least 75 days is standard in the industry.

Conventional asphalts used in roofing applications are generally subjected to an oxidation process in which air is blown through molten asphalt for a particular period of time to modify the physical properties of the asphalt. The oxidation process is used to raise the softening point of the asphalt to thereby increase the asphalt's resistance to flow at the high temperatures frequently encountered on a roof. The oxidation process is typically carried out over a period of time, such as 1 hour up to about 24 hours. The amount of time depends on various factors, such as the type of asphalt feedstock used, the processing temperature, the air flow rate, the design of the process equipment, and the desired characteristics of the asphalt to be produced. During the oxidation process, light fractions of the asphalt are stripped off and treated by environmental control equipment. The time, materials, and equipment required to carry out the oxidation process increases the overall cost of producing the asphalt.

The general inventive concepts described herein relate to asphalt compositions that include a virgin asphalt material and a reclaimed asphalt material. The inventive asphalt compositions can be used in roofing applications, including, but not limited to, BURA, roofing shingle coating asphalt, asphalt roofing shingles, and asphalt roll roofing. The general inventive concepts described herein also relate to methods of making asphalt compositions in which no oxidation/air blowing process is used, thus avoiding the drawbacks associated with the oxidation/air blowing process conventionally used to produce asphalt for use in roofing applications. In certain embodiments, the asphalt composition is a wax-modified asphalt composition.

In one exemplary embodiment, an asphalt composition suitable for use in roofing applications is provided. The asphalt composition comprises a virgin asphalt material and a reclaimed asphalt material. The reclaimed asphalt material has a solubility of at least 94% and a softening point of 190° F. to 320° F. Unless otherwise indicated, the term "solubility" when used in the context of an asphalt material refers to the solubility (%) of the asphalt either in trichloroethylene according to ASTM D2042, or in 1-bromopropane (n-propyl bromide) according to ASTM D7553. The asphalt composition has a solubility of at least 99%, a softening point of 135° F. to 235° F., and a penetration at 77° F. of 12 dmm to 60 dmm.

The virgin asphalt material used in the exemplary asphalt compositions disclosed herein may be one type or grade of virgin asphalt material or a mixture of different types or grades of virgin asphalt material. In certain embodiments, the virgin asphalt material used in the exemplary asphalt compositions disclosed herein comprises a paving grade asphalt. In certain embodiments, the virgin asphalt material used in the exemplary asphalt compositions disclosed herein comprises a flux asphalt. In certain embodiments, the virgin asphalt material used in the exemplary asphalt compositions disclosed herein comprises a combination of a paving grade asphalt and a flux asphalt.

In certain embodiments, the virgin asphalt material comprises a paving grade asphalt. Paving grade asphalts are typically harder (lower penetration) and higher in softening point and viscosity than the flux asphalts typically used to make coating asphalt. Typical paving grade asphalts are the straight run asphalts derived from the atmospheric and vacuum distillation of crude oils, or are made by blending vacuum tower residua with residua from solvent de-asphalting units. Suitable paving grade asphalts that may be used as the virgin asphalt material include, but are not limited to, PG64-22, PG67-22, PG70-22, PG58-22, PG58-28, PG70-16, PG70-10, PG67-10, pen grade 40-50, pen grade 60-70, pen grade 85-100, pen grade 120-150, pen grade 200-300, AR-4000, AR-8000, AC-30, and combinations thereof.

In certain embodiments, the virgin asphalt material comprises a flux asphalt. Typical flux asphalt is the organic residual material from the distillation of crude oil. Flux asphalt is less viscous and softer than paving grade asphalts, and typically has a softening point of 70° F. to 125° F., including from 80° F. to 120° F., from 90° F. to 115° F., and also including from 100° F. to 125° F.

As previously mentioned, the reclaimed asphalt material used in the exemplary asphalt compositions disclosed herein includes asphalt derived from tear-off shingles, manufactured waste shingles, and combinations thereof. The reclaimed asphalt material may be produced from a variety of asphalt recycling methods, such as the method described in U.S. Pat. No. 8,789,773, the disclosure of which is incorporated by reference herein in its entirety. Preferably, the reclaimed asphalt material contains no more than 6% by weight solids (i.e., a solubility of at least 94%), more preferably no more than 4% by weight solids (i.e., a solubility of at least 96%), and even more preferably no more than 1% by weight solids (i.e., a solubility of at least 99%). Such solids may include, for example, cellulose, paper, and inorganic materials such as glass fiber particles, sand, and minerals. The reclaimed asphalt material used in the exemplary asphalt compositions disclosed herein generally has a softening point of 190° F. to 320° F., including from 200° F. to 310° F., from 210° F. to 300° F., from 220° F. to 290° F., and also including from 190° F. to 235° F.

Using a significant amount of reclaimed asphalt material in the asphalt compositions disclosed herein provides a positive impact on the environment. Tear-off shingles and manufactured waste shingles are typically discarded in landfills. The asphalt compositions disclosed herein incorporate a significant amount (i.e., at least 50 wt. %) of asphalt derived from tear-off shingles and/or manufactured waste shingles, which provides an alternative use for this waste material that can reduce the amount of the waste material that is discarded in landfills. In addition, the use of reclaimed asphalt material frees up virgin asphalt material for other uses and products.

In certain embodiments, the asphalt composition comprises from 5% to 70% by weight virgin asphalt material and from 30% to 95% by weight reclaimed asphalt material. In certain embodiments, the asphalt composition comprises from 5% to 50% by weight virgin asphalt material and from 50% to 95% by weight reclaimed asphalt material. In certain embodiments, the asphalt composition comprises from 10% to 50% by weight virgin asphalt material and from 50% to 90% by weight reclaimed asphalt material. In certain embodiments, the asphalt composition comprises from 20% to 50% by weight virgin asphalt material and from 50% to 80% by weight reclaimed asphalt material. In certain embodiments, the asphalt composition comprises from 30% to 50% by weight virgin asphalt material and from 50% to 70% by weight reclaimed asphalt material. In certain embodiments, the asphalt composition comprises from 35% to 50% by weight virgin asphalt material and from 50% to 65% by weight reclaimed asphalt material. In certain embodiments, the asphalt composition comprises from 40% to 50% by weight virgin asphalt material and from 50% to 60% by weight reclaimed asphalt material. In certain embodiments, the asphalt composition comprises about 30% by weight virgin asphalt material and about 70% by weight reclaimed asphalt material. In certain embodiments, the asphalt composition comprises about 40% by weight virgin asphalt material and about 60% by weight reclaimed asphalt material. In certain embodiments, the asphalt composition comprises about 50% by weight virgin asphalt material and about 50% by weight reclaimed asphalt material. In any of the foregoing embodiments, the virgin asphalt material is at least one of a paving grade asphalt and a flux asphalt, and the reclaimed asphalt material is derived from at least one of tear-off shingles and manufactured waste shingles.

The exemplary asphalt compositions disclosed herein have a solubility of at least 99%, a softening point of 135° F. to 235° F., and a penetration at 77° F. of 12 dmm to 60 dmm. In certain exemplary embodiments, the asphalt composition comprising a virgin asphalt material and a reclaimed asphalt material has a solubility of at least 99%, a softening point of 135° F. to 151° F., and a penetration at 77° F. of 18 dmm to 60 dmm. Such asphalt compositions may be suitable for use as a Type I BURA.

In certain exemplary embodiments, the asphalt composition comprising a virgin asphalt material and a reclaimed asphalt material has a solubility of at least 99%, a softening point of 158° F. to 176° F., and a penetration at 77° F. of 18 dmm to 40 dmm. Such asphalt compositions may be suitable for use as a Type II BURA.

In certain exemplary embodiments, the asphalt composition comprising a virgin asphalt material and a reclaimed asphalt material has a solubility of at least 99%, a softening point of 185° F. to 205° F., and a penetration at 77° F. of 15 dmm to 35 dmm. Such asphalt compositions may be suitable for use as a Type III BURA. In order for the BURA to be properly applied at the desired thickness on a roof, the BURA must display a certain viscosity based on whether it will be mechanically applied or mopped on the roof. The Equiviscous Temperature (EVT) is used to determine the temperature the asphalt composition needs to be heated to meet the 125 cps for mopping and 75 cps for mechanical application (or cart). In certain embodiments, the asphalt composition comprising a virgin asphalt material and a reclaimed asphalt material has a solubility of at least 99%, a softening point of 185° F. to 205° F., a penetration at 77° F. of 15 dmm to 35 dmm, an EVT at 125 cPs of no more than 430° F., and an EVT at 75 cPs of no more than 470° F.

In certain exemplary embodiments, the asphalt composition comprising a virgin asphalt material and a reclaimed asphalt material has a solubility of at least 99%, a softening point of 210° F. to 225° F., and a penetration at 77° F. of 12 dmm to 25 dmm. Such asphalt compositions may be suitable for use as a Type IV BURA. In certain embodiments, the asphalt composition comprising a virgin asphalt material and a reclaimed asphalt material has a solubility of at least 99%, a softening point of 210° F. to 225° F., a penetration at 77° F. of 12 dmm to 25 dmm, an EVT at 125 cPs of no more than 455° F., and an EVT at 75 cPs of no more than 485° F.

In certain exemplary embodiments, the asphalt composition comprising a virgin asphalt material and a reclaimed asphalt material has a solubility of at least 99%, a softening point of 190° F. to 235° F., and a penetration at 77° F. of at least 15 dmm. Such asphalt compositions may be suitable for use as a roofing shingle coating asphalt as defined by ASTM D3462.

In certain exemplary embodiments, the asphalt composition comprising a virgin asphalt material and a reclaimed asphalt material has a solubility of at least 99%, a softening point of 140° F. to 158° F., and a penetration at 77° F. of 20 dmm to 30 dmm. Such asphalt compositions may be suitable for use as a base asphalt to produce a wax-modified asphalt according to ASTM D8051/D8051M-16.

Durability is one of the most sought-after properties for roofing products, since roofing products are often exposed to unfavorable temperature and weather conditions, and the ability for the roofing product to withstand such conditions is essential. As previously discussed, durability can be measured using ASTM D4798 in conjunction with ASTM D1670. The ASTM D4798 standard is used to simulate accelerated weathering of the asphalt composition, and then the ASTM D1670 standard, also known as a "spark test," is used to measure the extent of cracking and/or pitting of the asphalt to determine the extent of deterioration that occurs due to weathering. When conducting the durability testing, an asphalt composition is applied to an electrically conductive backing, such as an aluminum panel, and exposed to accelerated weathering caused by UV lighting and controlled conditions of humidity, moisture, and temperature. Throughout the weathering, the asphalt film may crack, which will expose the aluminum backing. A spark probe is then used to conduct a current in various locations of the panel. The probe will be able to conduct a current at any point in the asphalt film that has cracked in response to the weathering. As previously noted, conventional coating asphalts are desired to pass at least 75 days or cycles of accelerated weathering prior to showing signs of degradation or failure.

Because the exemplary asphalt compositions disclosed herein include at least 50% reclaimed asphalt material, including tear-off shingles that have been exposed to weathering on a roof for years, if not decades, it would not be expected that the asphalt compositions would be as durable as conventional coating asphalt. However, it has been unexpectedly found that the exemplary asphalt compositions comprising a virgin asphalt material and a reclaimed asphalt material exhibit a durability that is comparable to conventional coating asphalts, which are typically produced using an oxidation/air blowing process. In other words, the virgin asphalt material rejuvenates the reclaimed asphalt material. In certain embodiments, the exemplary asphalt composition comprising a virgin asphalt material and a reclaimed asphalt material has a durability according to ASTM D4798 and ASTM D1670 of at least 90 cycles or days. In certain embodiments, the exemplary asphalt composition comprising a virgin asphalt material and a reclaimed asphalt material has a durability according to ASTM D4798 and ASTM D1670 of at least 100 cycles or days. In certain exemplary embodiments, the exemplary asphalt composition comprising a virgin asphalt material and a reclaimed asphalt material has a durability according to ASTM D4798 and ASTM D1670 of at least 150 cycles or days.

In certain embodiments, the asphalt compositions comprising a virgin asphalt material and a reclaimed asphalt material does not exhibit a significant amount of "fallback." Fallback is a phenomenon that occurs when asphalt is exposed to high temperatures for a prolonged period of time. In general, the higher the temperature or the longer the asphalt is exposed to heat, the lower the softening point and higher the penetration value may become. In certain embodiments, even after being exposed to heat (between 350° F. to 500° F.) for up to 72 hours, the asphalt compositions comprising a virgin asphalt material and a reclaimed asphalt material do not exhibit a significant change (i.e., a change of at least 10%) in softening point.

In certain embodiments, the asphalt compositions comprising a virgin asphalt material and a reclaimed asphalt material has a stain index measured in accordance with ASTM D2746 of less than 15. In certain embodiments, the asphalt compositions comprising a virgin asphalt material and a reclaimed asphalt material has a stain index measured in accordance with ASTM D2746 of less than 10.

In some exemplary embodiments, a wax-modified asphalt composition suitable for use in roofing applications is provided. The wax-modified asphalt composition comprises a virgin asphalt material, a reclaimed asphalt material, and a wax. The reclaimed asphalt material has a solubility of at least 94% and a softening point of 190° F. to 320° F. The wax-modified asphalt composition has a solubility of at least 95%, a softening point of 210° F. to 230° F., and a penetration at 77° F. of 12 dmm to 30 dmm.

Any of the previously described virgin asphalt materials and reclaimed asphalt materials may be used in the exemplary wax-modified asphalt compositions disclosed herein. In certain embodiments, the virgin asphalt material used in the exemplary wax-modified asphalt compositions disclosed herein comprises a paving grade asphalt. In certain embodiments, the virgin asphalt material used in the exemplary wax-modified asphalt compositions disclosed herein comprises a flux asphalt. In certain embodiments, the virgin asphalt material used in the exemplary wax-modified asphalt compositions disclosed herein comprises a combination of a paving grade asphalt and a flux asphalt.

In certain embodiments, the reclaimed asphalt material used in the exemplary wax-modified asphalt compositions disclosed herein is derived from at least one of tear-off shingles and manufactured waste shingles. Preferably, the reclaimed asphalt material contains no more than 6% by weight solids (i.e., a solubility of at least 94%), more preferably no more than 4% by weight solids (i.e., a solubility of at least 96%), and even more preferably no more than 1% by weight solids (i.e., a solubility of at least 99%). The reclaimed asphalt material used in the exemplary wax-modified asphalt compositions disclosed herein generally has a softening point of 190° F. to 320° F., including from 200° F. to 310° F., from 210° F. to 300° F., from 220° F. to 290° F., and also including from 190° F. to 235° F.

In certain embodiments, the wax-modified asphalt composition comprises from 5% to 45% by weight virgin asphalt material, from 50% to 90% by weight reclaimed asphalt material, and up to 5% by weight wax. The phrase "up to 5% by weight wax" includes, for example, from 0.5% to 5% by weight wax, from 1% to 5% by weight wax, from 1% to 4% by weight wax, and also including from 1% to 3% by weight wax. In certain embodiments, the wax-modified asphalt composition comprises from 10% to 50% by weight virgin asphalt material, from 50% to 85% by weight reclaimed asphalt material, and up to 5% by weight wax. In certain embodiments, the wax-modified asphalt composition comprises from 20% to 50% by weight virgin asphalt material, from 50% to 75% by weight reclaimed asphalt material, and up to 5% by weight wax. In certain embodiments, the wax-modified asphalt composition comprises from 30% to 50% by weight virgin asphalt material, from 50% to 65% by weight reclaimed asphalt material, and up to 5% by weight wax. In certain embodiments, the wax-modified asphalt composition comprises from 40% to 45% by weight virgin asphalt material, from 50% to 55% by weight reclaimed asphalt material, and up to 5% by weight wax. In any of the foregoing embodiments, the virgin asphalt material is at least one of a paving grade asphalt and a flux asphalt, and the reclaimed asphalt material is derived from at least one of tear-off shingles and manufactured waste shingles.

Any suitable wax or a mixture of different waxes can be used in the exemplary wax-modified asphalt compositions disclosed herein. The wax can be a synthetic wax, functionalized wax, naturally occurring wax, and mixtures thereof. The wax can be oxidized, non-oxidized, and mixtures thereof. Exemplary synthetic waxes include, but are not limited to, ethylene bis-stearamide wax (EBS), Fischer-Tropsch wax (FT), oxidized Fischer-Tropsch wax (FTO), polyolefin waxes such as polyethylene wax (PE), oxidized polyethylene wax (PEO), polypropylene wax, polypropylene/polyethylene wax, alcohol wax, silicone wax, petroleum waxes such as microcrystalline wax or paraffin, chlorinated wax or paraffin, and other synthetic waxes. Exemplary functionalized waxes include, but are not limited to, amine waxes, amide waxes, ester waxes, carboxylic acid waxes, and microcrystalline waxes.

The naturally occurring wax can be derived from a plant, animal, or mineral. Some examples of natural waxes that may be suitable include plant waxes, such as, candelilla wax, carnauba wax, rice wax, Japan wax, and jojoba oil; animal waxes, such as, beeswax, lanolin, and whale wax; and mineral waxes, such as, montan wax, ozokerite, and ceresin.

In certain exemplary embodiments, the wax comprises at least one of: ethylene bis-stearamide wax; Fischer-Tropsch wax; oxidized Fischer-Tropsch wax; polyethylene wax; polypropylene wax; polypropylene/polyethylene wax; alcohol wax; silicone wax; microcrystalline wax; and paraffin wax. In certain other exemplary embodiments, the wax is a Fischer-Tropsch wax with a melt point of greater than 212° F. and a hardness at 77° F. of from 1 dmm to a value so soft that it cannot be measured by the techniques in ASTM D5. In another exemplary embodiment, the wax is a polyethylene wax with a melt point of 212° F. to 257° F., a hardness at 77° F. of 1 dmm to 7 dmm, a density of from 0.91 to 0.95 gm/cc, a viscosity of 20 to 450 cps at 284° F., and a nil acid number. In yet another exemplary embodiment, the wax is an oxidized polyethylene wax with a melt point of 275° F. to 284° F., a hardness of less than 0.5 dmm, a viscosity of 3600 cps to 4500 cps at 302° F., and acid number of 30.

Any suitable mixture of different waxes can also be used. For example, the wax used in the exemplary wax-modified asphalt composition may include a blend of a Fischer-Tropsch wax and a polyethylene wax.

In certain embodiments, the exemplary wax-modified asphalt composition comprising a virgin asphalt material, a reclaimed asphalt material, and a wax has a durability according to ASTM D4798 and ASTM D1670 of at least 90 cycles or days. In certain embodiments, the exemplary wax-modified asphalt composition comprising a virgin asphalt material, a reclaimed asphalt material, and a wax has a durability according to ASTM D4798 and ASTM D1670 of at least 100 cycles or days. In certain exemplary embodiments, the exemplary wax-modified asphalt composition comprising a virgin asphalt material, a reclaimed asphalt material, and a wax has a durability according to ASTM D4798 and ASTM D1670 of at least 150 cycles or days.

The exemplary asphalt compositions and wax-modified asphalt compositions disclosed herein may be made using a blending process, which does not include an oxidation process. By not using an oxidation process, a number of benefits can be achieved. For example, a significant reduction in manufacturing time can be achieved by eliminating an oxidation step, which may take up to 24 hours. In addition, because the oxidation step is eliminated, asphalt compositions can be made without blow loss (i.e., asphalt material that is lost during the oxidation process). Furthermore, by eliminating the oxidation process, a reduction in emissions can be achieved since no light fractions of asphalt are stripped off, which require treatment by environmental control equipment. Another benefit achieved by eliminating the oxidation step is the reduction of exposure to oxidized asphalt emissions, which are classified as probable carcinogens by the IARC, during the manufacturing process.

In one exemplary embodiment, a method of making an asphalt composition comprises mixing a virgin asphalt material with a reclaimed asphalt material at a temperature of 300° F. to 400° F. to form the asphalt composition. The reclaimed asphalt material has a solubility of at least 94% and a softening point of 190° F. to 320° F. The resulting asphalt composition has a solubility of at least 99%, a softening point of 135° F. to 235° F., and a penetration at 77° F. of 12 dmm to 60 dmm. The exemplary method of making the asphalt composition does not use an oxidation process. In certain embodiments, at least one of the virgin asphalt material and the reclaimed asphalt material are preheated prior to being mixed together.

Any of the previously described virgin asphalt materials, reclaimed asphalt materials, and weight percentages thereof may be used in the exemplary method of making an asphalt composition disclosed herein. In certain embodiments, the virgin asphalt material used in the method of making an asphalt composition comprises a paving grade asphalt. In certain embodiments, the virgin asphalt material used in the method of making an asphalt composition comprises a flux asphalt. In certain embodiments, the virgin asphalt material used in the method of making an asphalt composition comprises a combination of a paving grade asphalt and a flux asphalt.

In certain embodiments, the reclaimed asphalt material used in the method of making an asphalt composition is derived from at least one of tear-off shingles and manufactured waste shingles. Preferably, the reclaimed asphalt material contains no more than 6% by weight solids (i.e., a solubility of at least 94%), more preferably no more than 4% by weight solids (i.e., a solubility of at least 96%), and even more preferably no more than 1% by weight solids (i.e., a solubility of at least 99%). The reclaimed asphalt material used in the exemplary method of making an asphalt composition disclosed herein generally has a softening point of 190° F. to 320° F., including from 200° F. to 310° F., from 210° F. to 300° F., from 220° F. to 290° F., and also including from 190° F. to 235° F.

In certain embodiments, the method of making an asphalt composition comprises mixing from 5% to 50% by weight virgin asphalt material with from 50% to 95% by weight reclaimed asphalt material at a temperature of 300° F. to 400° F. In certain embodiments, the method of making an asphalt composition comprises mixing from 10% to 50% by weight virgin asphalt material with from 50% to 90% by weight reclaimed asphalt material at a temperature of 300° F. to 400° F. In certain embodiments, the method of making an asphalt composition comprises mixing from 20% to 50% by weight virgin asphalt material with from 50% to 80% by weight reclaimed asphalt material at a temperature of 300° F. to 400° F. In certain embodiments, the method of making an asphalt composition comprises mixing from 30% to 50% by weight virgin asphalt material with from 50% to 70% by weight reclaimed asphalt material at a temperature of 300° F. to 400° F. In certain embodiments, the method of making an asphalt composition comprises mixing from 35% to 50% by weight virgin asphalt material with from 50% to 65% by weight reclaimed asphalt material at a temperature of 300° F. to 400° F. In certain embodiments, the method of making an asphalt composition comprises mixing from 40% to 50% by weight virgin asphalt material with from 50% to 60% by weight reclaimed asphalt material at a temperature of 300° F. to 400° F. In certain embodiments, the method of making an asphalt composition comprises mixing from 45% to 50% by weight virgin asphalt material with from 50% to 55% by weight reclaimed asphalt material at a temperature of 300° F. to 400° F. In certain embodiments, the method of making an asphalt composition comprises mixing about 30% by weight virgin asphalt material with about 70% by weight reclaimed asphalt material at a temperature of 300° F. to 400° F. In certain embodiments, the method of making an asphalt composition comprises mixing about 40% by weight virgin asphalt material with about 60% by weight reclaimed asphalt material at a temperature of 300° F. to 400° F. In certain embodiments, the method of making an asphalt composition comprises mixing about 50% by weight virgin asphalt material with about 50% by weight reclaimed asphalt material at a temperature of 300° F. to 400° F. In any of the foregoing embodiments, the virgin asphalt material is at least one of a paving grade asphalt and a flux asphalt, and the reclaimed asphalt material is derived from at least one of tear-off shingles and manufactured waste shingles.

In certain embodiments, the asphalt compositions resulting from the exemplary method of making an asphalt composition meet the specifications for Type I, Type II, Type III, or Type IV BURA as defined by ASTM D312/D312M-16a. In certain embodiments, the asphalt compositions resulting from the exemplary method of making an asphalt composition meet the specifications for a base asphalt prior to wax modification as defined by ASTM D8051/D8051M-16. In certain embodiments, the asphalt compositions resulting from the exemplary method of making an asphalt composition meet the specifications for roofing shingle coating asphalt as defined by ASTM D3462. In certain embodiments, the asphalt compositions resulting from the exemplary method of making an asphalt composition disclosed herein have a durability according to ASTM D4798 and ASTM D1670 of at least 90 cycles or days, including at least 100 cycles or days, and also including at least 150 cycles or days.

In one exemplary embodiment, a method of making a wax-modified asphalt composition comprises mixing a virgin asphalt material, a reclaimed asphalt material, and a wax at a temperature of 300° F. to 400° F. to form the wax-modified asphalt composition. The reclaimed asphalt material has a solubility of at least 94% and a softening point of 190° F. to 320° F. The resulting wax-modified asphalt composition has a solubility of at least 95%, a softening point of 210° F. to 230° F., and a penetration at 77° F. of 12 dmm to 30 dmm. The exemplary method of making the wax-modified asphalt composition does not use an oxidation process. In certain embodiments, at least one of the virgin asphalt material, the reclaimed asphalt material, and the wax are preheated prior to being mixed together.

Any of the previously described virgin asphalt materials and reclaimed asphalt materials may be used in the exemplary method of making a wax-modified asphalt composition disclosed herein. In certain embodiments, the virgin asphalt material used in the method of making a wax-modified asphalt composition comprises a paving grade asphalt. In certain embodiments, the virgin asphalt material used in the method of making a wax-modified asphalt composition comprises a flux asphalt. In certain embodiments, the virgin asphalt material used in the method of making a wax-modified asphalt composition comprises a combination of a paving grade asphalt and a flux asphalt.

In addition, any of the previously described waxes may be used in the exemplary method of making a wax-modified asphalt composition disclosed herein. In certain embodiments, the wax used in the method of making a wax-modified asphalt composition comprises at least one of: ethylene bis-stearamide wax; Fischer-Tropsch wax; oxidized Fischer-Tropsch wax; polyethylene wax; polypropylene wax; polypropylene/polyethylene wax; alcohol wax; silicone wax; microcrystalline wax; and paraffin wax.

In certain embodiments, the reclaimed asphalt material used in the method of making a wax-modified asphalt composition is derived from at least one of tear-off shingles and manufactured waste shingles. Preferably, the reclaimed asphalt material contains no more than 6% by weight solids (i.e., a solubility of at least 94%), more preferably no more than 4% by weight solids (i.e., a solubility of at least 96%), and even more preferably no more than 1% by weight solids (i.e., a solubility of at least 99%). The reclaimed asphalt material used in the method of making a wax-modified asphalt composition disclosed herein generally has a softening point of 190° F. to 320° F., including from 200° F. to 310° F., from 210° F. to 300° F., from 220° F. to 290° F., and also including from 190° F. to 235° F.

In certain embodiments, the method of making a wax-modified asphalt composition comprises mixing together 5% to 45% by weight virgin asphalt material, 50% to 90% by weight reclaimed asphalt material, and up to 5% by weight wax at a temperature of 300° F. to 400° F. In certain embodiments, the method of making a wax-modified asphalt composition comprises mixing together 10% to 50% by weight virgin asphalt material, 50% to 85% by weight reclaimed asphalt material, and up to 5% by weight wax at a temperature of 300° F. to 400° F. In certain embodiments, the method of making a wax-modified asphalt composition comprises mixing together 20% to 50% by weight virgin asphalt material, 50% to 75% by weight reclaimed asphalt material, and up to 5% by weight wax at a temperature of 300° F. to 400° F. In certain embodiments, the method of making a wax-modified asphalt composition comprises mixing together 30% to 50% by weight virgin asphalt material, 50% to 65% by weight reclaimed asphalt material, and up to 5% by weight wax at a temperature of 300° F. to 400° F. In certain embodiments, the method of making a wax-modified asphalt composition comprises mixing together 40% to 45% by weight virgin asphalt material, 50% to 55% by weight reclaimed asphalt material, and up to 5% by weight wax at a temperature of 300° F. to 400° F. In any of the foregoing embodiments, the virgin asphalt material is at least one of a paving grade asphalt and a flux asphalt, and the reclaimed asphalt material is derived from at least one of tear-off shingles and manufactured waste shingles. Furthermore, in any of the foregoing embodiments, the wax comprises at least one of: ethylene bis-stearamide wax; Fischer-Tropsch wax; oxidized Fischer-Tropsch wax; polyethylene wax; polypropylene wax; polypropylene/polyethylene wax; alcohol wax; silicone wax; microcrystalline wax; and paraffin wax.

In certain embodiments, the wax-modified asphalt compositions resulting from the method of making a wax-modified asphalt composition meet the specifications for wax-modified asphalt as defined by ASTM D8051/D8051M-16. In certain embodiments, the wax-modified asphalt compositions resulting from the method of making a wax-modified asphalt composition have a durability according to ASTM D4798 and ASTM D1670 of at least 90 cycles or days, including at least 100 cycles or days, and also including at least 150 cycles or days.

The general inventive concepts have been described above both generically and with regard to various exemplary embodiments. Although the general inventive concepts have been set forth in what is believed to be exemplary illustrative embodiments, a wide variety of alternatives known to those of skill in the art can be selected within the generic disclosure. The general inventive concepts are not otherwise limited, except for the recitation of the claims set forth below. The following examples are meant to better illustrate the general inventive concepts and are not to be construed as limiting of the general inventive concepts of the present disclosure.

Examples

Three exemplary asphalt compositions were prepared using virgin asphalt material and reclaimed asphalt material. The asphalt compositions were prepared by mixing virgin asphalt material with reclaimed asphalt material at a temperature of 300° F. to 400° F., and no oxidation process was used. Certain physical properties of the virgin asphalt material and the reclaimed asphalt materials are listed in Table 2, and certain physical properties of the asphalt compositions are listed in Table 3.

TABLE 2

| Property | Virgin Asphalt Material 1 | Reclaimed Asphalt Material 1 | Reclaimed Asphalt Material 2 |
| --- | --- | --- | --- |
| Softening point, ° F. | 109 (ASTM D36) | 278 (ASTM D3461) | 227.2 (ASTM D3461) |
| Penetration at 77° F., dmm | 129 | 8 | 12.3 |
| Viscosity at 400° F., cP | 944 | 2,785 | 433 |
| Solubility in trichloroethylene, % | ND | 99.81 | 99.48 |

ND = not determined

TABLE 3

| Property | Asphalt Composition 1 | Asphalt Composition 2 | Asphalt Composition 3 |
| --- | --- | --- | --- |
| Softening point, ° F. (ASTM D3461) | 202.1 | 190.5 | 197.4 |
| Penetration at 77° F., dmm | 18 | 19 | 17.6 |
| Solubility in trichloroethylene, % | 99.81 | 99.69 | 99.69 |
| EVT at 125 cP, ° F. | 429 | 411 | 422 |
| EVT at 75 cP, ° F. | 461 | 440 | 451 |

Reclaimed Asphalt Material 1 and Reclaimed Asphalt Material 2 were both derived from tear-off shingles. Virgin Asphalt Material 1 was a flux asphalt.

Asphalt Composition 1 was prepared using 60% by weight Reclaimed Asphalt Material 1 and 40% by weight Virgin Asphalt Material 1. Asphalt Composition 1 possesses properties suitable for use as a Type III BURA and as coating asphalt. In addition, Asphalt Composition 1 had a durability of 121 cycles or days, using the procedures of ASTM D4798 and ASTM D1670.

Asphalt Composition 2 was prepared using 70% by weight Reclaimed Asphalt Material 2 and 30% by weight Virgin Asphalt Material 1. Asphalt Composition 2 possesses properties suitable for use as a Type III BURA and as coating asphalt.

Asphalt Composition 3 was prepared using 75% by weight Reclaimed Asphalt Material 2 and 25% by weight Virgin Asphalt Material 1. Asphalt Composition 3 possesses properties suitable for use as a Type III BURA and as coating asphalt.

The asphalt compositions of the present disclosure can comprise, consist of, or consist essentially of the essential elements and limitations of the disclosure as described herein, as well as any additional or optional components or limitations described herein or otherwise useful in asphalt composition applications.

In some embodiments, it may be possible to utilize the various inventive concepts in combination with one another. Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

The scope of the general inventive concepts presented herein are not intended to be limited to the particular exemplary embodiments shown and described herein. From the disclosure given, those skilled in the art will not only understand the general inventive concepts and their attendant advantages, but will also find apparent various changes and modifications to the devices, systems, and methods disclosed. It is sought, therefore, to cover all such changes and modifications as fall within the spirit and scope of the general inventive concepts, as described and/or claimed herein, and any equivalents thereof.

What is claimed is:

1. An asphalt composition comprising:
   a virgin asphalt material; and
   a reclaimed asphalt material having a solubility of at least 94% and a softening point of 190° F. to 320° F.,
   wherein the asphalt composition has a solubility of at least 99%, a softening point of 135° F. to 235° F., and a penetration at 77° F. of 12 dmm to 60 dmm.

2. The asphalt composition of claim 1, which comprises from 5% to 70% by weight virgin asphalt material and from 30% to 95% by weight reclaimed asphalt material.

3. The asphalt composition of claim 1, wherein the reclaimed asphalt material is derived from at least one of tear-off shingles and manufactured waste shingles.

4. The asphalt composition of claim 1, wherein the asphalt composition has a softening point of 185° F. to 205° F. and a penetration at 77° F. of 15 dmm to 35 dmm.

5. The asphalt composition of claim 1, wherein the asphalt composition has a softening point of 210° F. to 225° F. and a penetration at 77° F. of 12 dmm to 25 dmm.

6. The asphalt composition of claim 1, wherein the asphalt composition has a softening point of 190° F. to 235° F., and a penetration at 77° F. of at least 15 dmm.

7. The asphalt composition according to claim 1, wherein the asphalt composition has a durability according to ASTM D4798 and ASTM D1670 of greater than 90 days.

8. A wax-modified asphalt composition comprising:
   a virgin asphalt material;
   a reclaimed asphalt material having a solubility of at least 94% and a softening point of 190° F. to 320° F.; and
   a wax,
   wherein the wax-modified asphalt composition has a solubility of at least 95%, a softening point of 210° F. to 230° F., and a penetration at 77° F. of 12 dmm to 30 dmm.

9. The asphalt composition of claim 8, which comprises from 5% to 45% by weight virgin asphalt material, from 50% to 90% by weight reclaimed asphalt material, and up to 5% by weight wax.

10. The asphalt composition of claim 8, wherein the reclaimed asphalt material is derived from at least one of tear-off shingles and manufactured waste shingles.

11. The asphalt composition of claim 8, wherein the wax comprises at least one of: ethylene bis-stearamide wax; Fischer-Tropsch wax; oxidized Fischer-Tropsch wax; polyethylene wax; polypropylene wax; polypropylene/polyethylene wax; alcohol wax; silicone wax; microcrystalline wax; and paraffin wax.

12. The asphalt composition of claim 8, wherein the asphalt composition has a durability according to ASTM D4798 and ASTM D1670 of greater than 90 days.

13. A method of making an asphalt composition, the method comprising:
    mixing a virgin asphalt material with a reclaimed asphalt material at a temperature of 300° F. to 400° F. to form the asphalt composition,
    wherein the reclaimed asphalt material has a solubility of at least 94% and a softening point of 190° F. to 320° F.,
    wherein the asphalt composition has a solubility of at least 99%, a softening point of 135° F. to 225° F., and a penetration at 77° F. of 12 dmm to 35 dmm, and
    wherein no oxidation or air blowing process is used to make the asphalt composition.

14. The method of claim 13, wherein the asphalt composition comprises from 5% to 70% by weight virgin asphalt material and from 30% to 95% by weight reclaimed asphalt material.

15. The method of claim 13, wherein the reclaimed asphalt material is derived from at least one of tear-off shingles and manufactured waste shingles.

16. The method of claim 13, wherein the asphalt composition has a softening point of 185° F. to 205° F. and a penetration at 77° F. of 15 dmm to 35 dmm.

17. The method of claim 13, wherein the asphalt composition has a softening point of 210° F. to 225° F. and a penetration at 77° F. of 12 dmm to 25 dmm.

18. The method of claim 13, wherein the asphalt composition has a softening point of 190° F. to 235° F., and a penetration at 77° F. of at least 15 dmm.

19. The method of claim 13, wherein the asphalt composition has a durability according to ASTM D4798 and ASTM D1670 of greater than 90 days.

20. An asphalt roofing shingle comprising an asphalt composition according to claim 1.

21. An asphalt roofing shingle comprising a wax-modified asphalt composition according to claim 8.

22. Asphalt roll roofing comprising an asphalt composition according to claim 1.

23. Asphalt roll roofing comprising an asphalt composition according to claim 8.

* * * * *